2 Sheets--Sheet 1.
S. HUGHES.
Hydraulic-Attachment for Cotton-Presses.
No. 6,667. Reissued Sept. 28, 1875.
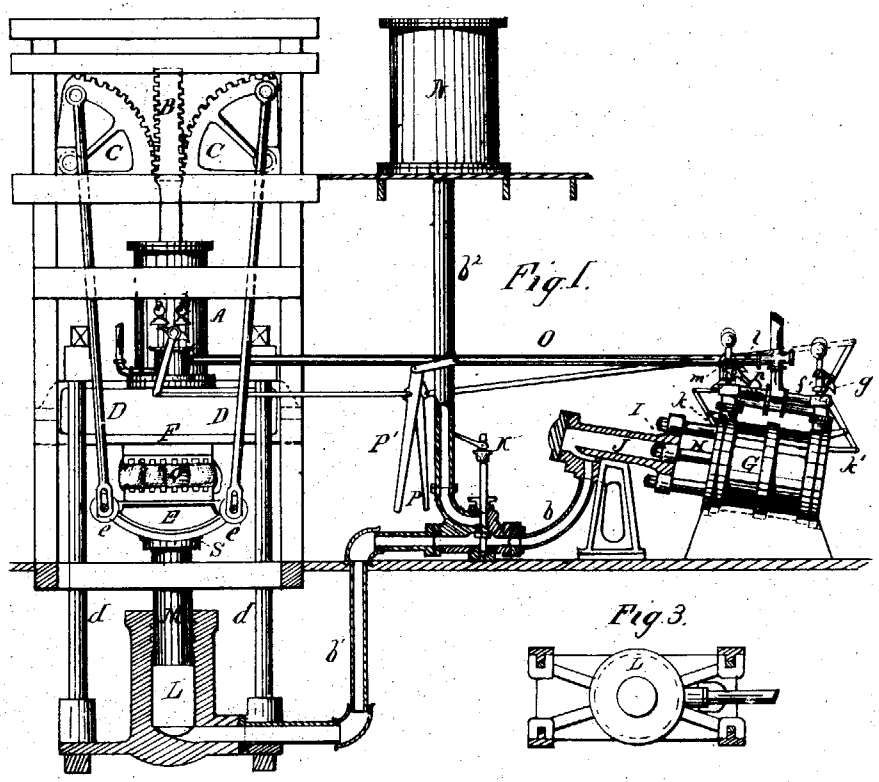
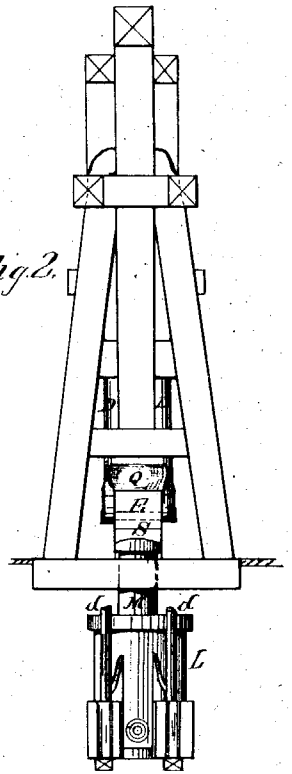
WITNESSES
E. F. Nottingham
C. E. Brereton
INVENTOR
Samuel Hughes.
By Leggett & Leggett Attorneys.

S. HUGHES.

Hydraulic-Attachment for Cotton-Presses.

No. 6,667. Reissued Sept. 28, 1875.

WITNESSES
E. F. Nottingham.
C. E. Brereton

INVENTOR
Samuel Hughes.

By Leggett & Leggett Attorneys.

UNITED STATES PATENT OFFICE.

SAMUEL HUGHES, OF CHARLESTON, SOUTH CAROLINA, ASSIGNOR TO HIMSELF AND MICHAEL KELLY, OF SAME PLACE.

IMPROVEMENT IN HYDRAULIC ATTACHMENTS FOR COTTON-PRESSES.

Specification forming part of Letters Patent No. 150,044, dated April 21, 1874; reissue No. 6,667, dated September 28, 1875; application filed August 25, 1875.

*To all whom it may concern:*

Be it known that I, SAMUEL HUGHES, of the city and county of Charleston, in the State of South Carolina, have invented certain Improvements in Power-Presses for Compressing Cotton, Baling Goods, and other purposes, whereof the following is a description, reference being had to the accompanying drawing making a part of this specification.

The invention consists in certain attachments to a progressive-lever power-press, whereby different pressures are made to cooperate, and with constantly-varying levers, to cause any desired pressure to be applied at any stage during the operation of compression.

Prior to describing my invention, it may be observed that in progressive-lever presses, used for pressing and baling cotton, and in which the actuating power is steam, brought to bear upon a piston arranged within a cylinder, and connected with the levers by which a moving platen is operated, it is known that unless the piston of said steam-cylinder travels the whole length of its upward or compressing stroke, the full power of the press is not exerted on the material under compression, and no two succeeding bales or masses can be compressed to the same bulk or density unless they are of the same density and size before being compressed, excepting by removing or adding packing, usually termed "shifting-boards," and the compressing action of the platen being repeated on the mass. It accordingly not infrequently takes two, and sometimes three, cylinders full of steam to fully or properly compress a bale of cotton.

By my invention each bale or mass may be compressed to the same density or bulk at or by a single compression, and the only limit to the power of the press is the strength of the material used in the construction of it.

My invention can readily be applied to steam or power presses already in use, and the latter be made more powerful, requiring no double pressing of a single bale or mass, and dispensing, if desired, with all packing or shifting boards to follow up the action of the platen.

Figure 4:
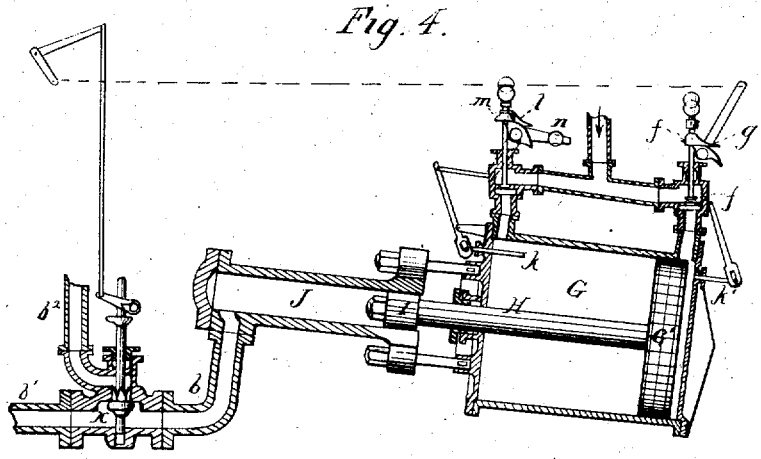
Figure 5:
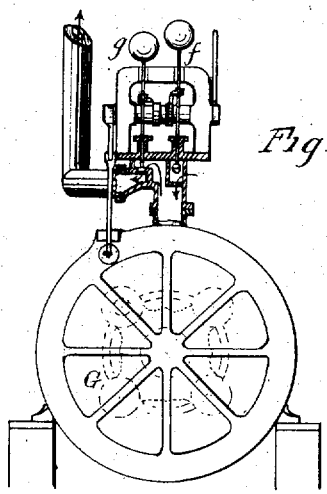
Figure 6:
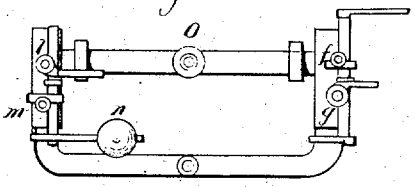

In the accompanying drawings, Figure 1 represents a partly-sectional side view of my invention as applied to an ordinary progressive-lever press actuated by steam. Fig. 2 is an end view of the same. Fig. 3 is a plan of the hydraulic-cylinder portion of the attachment. Fig. 4 is a vertical longitudinal section, upon a larger scale, of my hydraulic-power attachment in part; Fig. 5, an end view of the same, with the rear steam and exhaust valve portion thereof in section; and Fig. 6, a plan of the valve-gear of the steam portion of the hydraulic-power attachment.

Similar letters of reference indicate corresponding parts.

A is the steam-cylinder of an ordinary progressive-lever press, the piston-rod of such steam-cylinder having the usual double rack B, which is arranged to gear with the two toothed sectors or levers C C, that are connected by rods or pitmen D D with a movable bed or platen, E. This, with the exception of certain details of construction, as hereinafter referred to, is similar to other presses now in use. G is the steam-cylinder of the hydraulic-power attachment. The piston-rod H of this cylinder passes through a stuffing-box in the head of the steam-cylinder G, and is provided on its outer end with a plunger, I, arranged to work closely within a hydraulic cylinder, J. K is a check-valve, opening downward, and connected by a pipe, *b*, with the hydraulic cylinder J. L is a hydraulic-ram cylinder or chamber, arranged to rest upon a suitable foundation, and connected with the upper platen F of the press. This cylinder is connected by a pipe, $b^1$, with the chamber of the check-valve K in direct communication with the pipe *b* of the cylinder J, and said cylinder L fitted with a ram, M, arranged to work through it. This ram M is provided with a curved saddle, S, which is fitted to the platen E.

The connecting rods or pitmen D D of the press have elongated eyes or slots *e e* at their lower ends, to admit of the platen E being forced upward after the piston of the steam-cylinder A has completed its upstroke, and the levers or sectors C C have moved to a position which terminates the upward pulls of the rods D D. N is a reservoir, placed above the hydraulic ram, the check-valve K, and the cylinder J, and connected by a pipe, $b^2$, with the check-valve chamber above the valve.

O is the pipe by which steam is supplied to the engine-cylinders A and G, which are fitted with any suitable valve mechanism, including steam and exhaust valves, a lever, P, serving to operate the steam-valve *f*, and exhaust-valve *g* of the cylinder G, also the check-valve K. Thus, the movement of the levers P P′ to an intermediate position causes all of said valves to be closed. By moving the levers P P′ to the right, steam-valves *f h* and check-valve K are opened, the exhaust-valves *g* and *i* remaining closed, and by moving said levers to their extreme left the exhaust-valves *g i* are opened and the steam-valves *f* and *h* are closed. The several valves hereinbefore referred to are operated by means of rock-shafts, toes, wipers, and other suitable connections. The piston G′ of the cylinder G is prevented from striking the heads of the latter at either end of the stroke by coming in contact with rods *k k′* running through the cylinder-heads, and connected on the outside with levers, which, in their turn, are connected by rods to other levers secured to the rock-shafts that operate the steam-valves, so that as either rod *k k′* is forced outward by the piston G′ it opens the steam-valves at such end of the cylinder and admits steam to act as a cushion to the piston. The steam-valve *l*, at the forward end of the cylinder G, is closed by a weight on the end of the valve-stem, and is opened only when the piston G comes in contact with the rod *k*. The exhaust-valve *m*, at such end of the cylinder, is opened by a lever and weight, *n*, and closed only when the piston G′ strikes the rod, which causes the wiper operating the valve to leave the toe, when a weight on the end of the valve-stem closes the valve. The valves and valve mechanism, however, form no part of my invention, and may, if desired, be of any suitable kind.

To operate the press, fill the reservoir N with oil, water, or other suitable liquid, and open the check-valve K, thereby allowing the liquid to fill the cylinder J and the pipes connected therewith. A bale or mass, Q, of the material to be compressed, having been placed upon the platen E, steam is admitted to the cylinder A by opening the steam-valve *h*. This causes the piston of said cylinder to ascend, and by means of the rack B, toothed sectors or levers C C, and connecting-rods D D, draw up the platen E until said piston reaches the end of its stroke or is stopped by the resistance of the material being compressed. By reason of the attachment of the ram M to the platen E, it is carried with the platen, and the check-valve *k* being open, the liquid from the reservoir N flows through the connecting-pipes into the ram-cylinder L, and fills the space previously occupied by the ram.

A finishing pressure is then given to the bale by admitting steam to the rear end of the cylinder G by opening the steam-valves. This causes the piston G′ to move forward, and with the plunger I, which forces liquid from the cylinder J through the connecting-pipes *b b′* (closing the check-valve K) into the ram-cylinder L, thereby forcing the ram M and platen E still farther up, and powerfully compressing the bale between the platens, the elongated eyes or slots *e e* in the rods D D admitting of such continued action of the platen E. The bale having been properly tied and ready for taking out of the press, the steam-valve *f* is closed, and the exhaust-valves *g i* and check-valve K opened. The weight of the movable platen, sectors, and connecting-rods, together with the expansion of the compressed material, causes the platen E and ram M to descend, forcing the liquid from the cylinder L through the pipes $b^1$ $b^2$ into the reservoir N, and by the pipe *b* into the hydraulic cylinder J, thereby driving backward the piston G′ to the rear end of the cylinder G.

The piston G′ may be assisted in its backward movement by setting it and its cylinder slightly inclining, as represented.

The same operation is repeated for the next bale or mass, and so on successively for any number of bales, &c., all of which will be compressed to the same bulk or density.

The circulation is kept up of the liquid between the cylinders J and L by the opening and closing of the check-valve K at each compressing operation, whereby is insured a constant fresh supply of cooling-liquid to the exposed packings, rendering them more durable. It is evident, however, that the foregoing described arrangement and combination of the steam-cylinder A with the hydraulic ram M does not restrict or bound my invention, the latter consisting, essentially, in uniting, in a progressive-lever press, the direct and independent pressures of steam and liquid.

What I claim as new, and desire to secure by Letters Patent, is—

1. The combination, in a lever power-press, of a steam-actuated piston, for giving a part of the pressure to the platens, and a hydraulic actuated piston or plunger, for giving a part of the pressure to the platens, substantially as and for the purpose described.

2. The combination, in a progressive-lever power-press, wherein the compression is partly effected by the direct pressure of steam, of an independent hydraulic-pressure apparatus with the platen of the press, the said hydraulic apparatus arranged relatively to the platen, substantially as described, whereby, as the pressure is released from the platen, the liquid will be returned to the primary forcing apparatus.

3. In a progressive-lever power-press, the combination, with the piston and steam-cylinder A, of the auxiliary hydraulic cylinder or chamber L and ram M, arranged in relation with the platen E, substantially as and for the purpose described.

4. In a progressive-lever power-press, the rods D D, provided with elongated eyes *e e*, in combination with the platen E and hydraulic jack or ram M, substantially as and for the purpose described.

5. In a progressive-lever power-press, the combination of the steam-piston G′ and its cylinder with the plunger I, the cylinder J, the cylinder or chamber L of the ram M, the pipe $b$ $b^1$, the platen E, and the steam-cylinder A and its mechanical connections, substantially as and for the purposes described.

6. In a progressive-lever power-press, the reservoir N and pipe $b^2$, in combination with the check-valve K and pipes $b$ $b^1$, connecting the hydraulic cylinder J with the chamber L of the ram, all arranged for operation in relation with each other, substantially as and for the purpose described.

In testimony that I claim the foregoing I have hereunto set my hand this 24th day of August, A. D. 1875.

SAMUEL HUGHES.

Witnesses:
THOMAS B. HALL,
E. I. NOTTINGHAM.